1,446,610

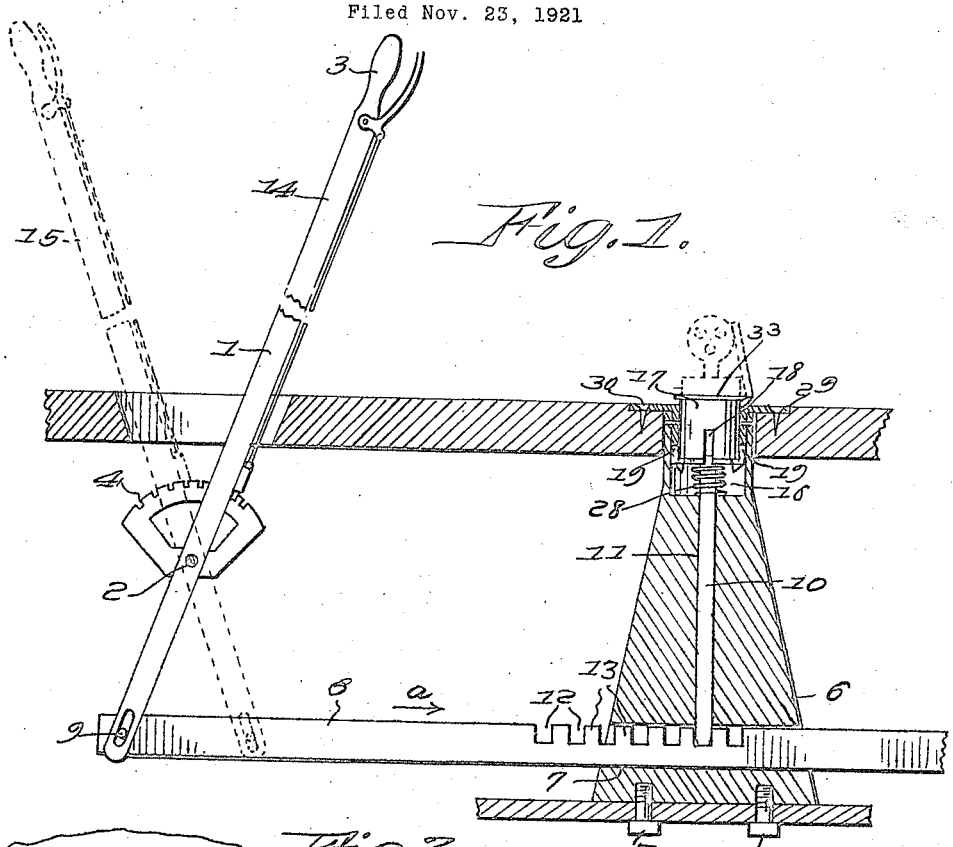
Feb. 27, 1923.                                                                 1,446,610
G. BELL
AUTOMOBILE EMERGENCY BRAKE LEVER LOCK
Filed Nov. 23, 1921
Inventor
G. Bell
By Watson E. Coleman
Attorney Patented Feb. 27, 1923.

UNITED STATES PATENT OFFICE.

GODFREY BELL, OF LOS ANGELES, CALIFORNIA.

AUTOMOBILE EMERGENCY-BRAKE-LEVER LOCK.

Application filed November 23, 1921. Serial No. 517,277.

*To all whom it may concern:*

Be it known that I, GODFREY BELL, a citizen of the United States, residing at Los Angeles, in the county of Los Angeles and State of California, have invented certain new and useful Improvements in Automobile Emergency-Brake-Lever Locks, of which the following is a specification, reference being had to the accompanying drawings.
A great many automobiles, locked in the usual manner, are stolen by towing them away, therefore the purpose of the present invention is to provide an emergency brake lever lock, to lock the rear wheels, thereby rendering the automobile practically immovable under such brake conditions.

Another purpose is to provide a lock of this character, wherein a rack bar is connected to the emergency brake lever, and is movable through a guide, in combination with the locking pin of a tumbler lock, so that when the tumbler lock is depressed, the pin may engage the rack bar, and thereby hold it against movement, and locking the emergency brake lever, which has been operated, in order to put on the emergency brakes to their limit, thereby locking the rear wheels and making the car practically immovable.
Still another purpose is the provision of means for locking the tumbler lock when depressed, in combination with means for raising the tumbler lock when released. In order to depress and operate the tumbler lock foot pressure is applied thereon.

A further purpose is the provision of a suitable dust cover fitting over the tumbler lock, to keep out the dust and other foreign matter. When it is desired to unlock the lock, the cover is removed, the key inserted, and the tumbler lock operated, whereby the spring means will actuate to raise the same and release the rack bar.

When the automobile is first stopped, the dust cover is in position over the tumbler lock, and immediately after applying the emergency brake, foot pressure may be applied upon the cover, which will also move the tumbler lock, thereby causing the same to actuate to lock its pin.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a sectional view showing the emergency brake lever and its rack bar, and showing a guide for the rack bar, together with the locking mechanism for locking the rack bar.

Figure 2 is a vertical sectional view at right angles to that shown in Figure 1.

Figure 3 is a plan view of the lock showing the cover closed; and

Figure 4 is a plan view showing the cover opened.

Referring to the drawings 1 designates an emergency brake lever, which is pivoted at 2, at any suitable location, with its handle 3 above the foot board or the floor of the automobile, said lever also including the hand grip which operates a dog, for releasing the lever, the usual rack 4 being also illustrated.

Secured by suitable bolts 5 to the frame of the car is a stand 6 provided with a guide opening 7, to slidably receive a rack bar 8, which is pivoted at 9 to the lower end of the emergency brake lever.

A locking pin 10 is mounted in a vertical guide 11 of the stand, and when depressed it is designed to enter any one of the spaces 12 between the teeth 13 of the rack bar, thereby holding the rack bar in different positions.

In other words the emergency brake lever is disposed normally in a forward position as shown in dotted lines 15, and when the automobile is brought to a stop the brake lever is moved rearwardly as shown in full lines 14, which moves the rack bar in the direction of the arrow *a*, in a position in order to be locked by the pin.

The upper part of the stand 6 has a chamber 16, in which a tumbler lock casing 17 is mounted for vertical movement. This tumbler lock casing has diametrically opposite slots 18, in which the dogs 19 are pivoted at 20. When the lock casing 17 is depressed, the beveled edges 21 of the noses of the dogs cam against the lugs 22, pressing the noses of the dogs toward each other, so that the shoulders 23 of the dogs may engage behind the shoulders 24 of the beveled lugs, thereby holding the tumbler lock casing in a depressed position.

The locking pin 10 is rectangular or square in cross section, and its upper end is provided with a head 25, which is secured to the tumbler lock proper 26 by means of a plate 27. A coil spring 28 is in surrounding relation to the locking pin, and is interposed between the bottom of the chamber 16 and the tumbler lock casing, thereby normally holding the tumbler lock casing in a raised position. A plate 29 is secured to the floor of the car by means of screws 30, and is provided with a flanged opening 31, through which the tumbler lock casing engages. The flange 32 of the plate 29 surrounds the tumbler lock casing, and its lower marginal edge is engaged by the annular flange of the lock casing, thereby preventing upward movement of the lock casing, when it is in its uppermost position.

Obviously when the emergency brake is applied the rack bar has been moved in the direction of the arrow a, then the chauffeur or operator applies foot pressure upon the tumbler lock casing, which is provided with a cover 33. This cover is hingedly mounted at 35 on the lock casing 17, there being a coil spring 36, sufficiently tensioned and arranged so as to maintain the cover 33 normally closed. When pressure is applied upon the tumbler lock casing the foot engages the cover 33, and when the tumbler lock casing moves downwardly the tumbler lock 26 also moves, as well as the locking pin, until the lower end of the pin engages one of the spaces 12 between the teeth 13 of the rack bar, thereby holding the rack bar against movement, and also locking the rear wheel of the automobile, hence rendering the automobile practically immovable, unless the automobile is towed, and in this case the rear wheels will skid. Under these conditions the unauthorized person who is attempting to appropriate the automobile is unable to go very far before being stopped.

The cover 33 is provided for the purpose of keeping out dust and other foreign matter, and is always held closed by the spring, especially when unlocking the tumbler lock. In this case the owner when returning to the automobile will simply lift the cover on its pivot, inserting the key, and actuate the tumbler lock 26. The key is shown in dotted lines as inserted in the tumbler lock, and when the same is in the act of passing through the tumbler lock, it will actuate the members 34 in any suitable manner (not shown), which will oscillate the upper ends of the dogs, and move their lower ends inwardly toward each other, hence disengaging the shoulders 23 from the shoulders 24, permitting the spring 28 to force the tumbler lock casing upwardly, and since the locking pin is carried by the tumbler lock (which is secured in the casing 17 in any suitable manner not shown), the rack is released, then the emergency brake is free to be actuated.

The plate 29 is used simply to cover the opening in the foot board or floor board of the automobile, and has no connection whatever with the standard, with the exception that it fits into the top of the standard. This plate can be detached without affecting the standard, or the foot board or the floor board of the automobile together with the plate may be removed without affecting the standard, or the plate 29 may be first detached, and then the foot or floor board, in either case the plate will not affect the standard in any way.

The invention having been set forth, what is claimed as being useful is:

1. In an automobile emergency brake lever lock, the combination with an emergency brake lever, of a guide, a rack pivoted to the brake lever and movable through the guide, foot actuated depressible means to engage any one of the teeth of the rack for locking the same in a position when the emergency brake lever is moved to apply the brake.

2. In an automobile emergency brake lever lock, an emergency brake lever, a standard having a guide, a rack pivoted to one end of the lever and operable through the guide, said standard having a second guide at right angles to the first guide, a locking pin mounted in the second guide, and a spring tensioned tumbler lock mounted on the upper end of the standard and being operatively connected to the pin, whereby when depressed the pin may engage any one of the teeth of the rack, thereby locking the same and holding the brake lever in a locked position.

3. In an automobile emergency brake lever lock, an emergency brake lever, a rack pivoted to one end thereof, a standard having a guide for the rack, a locking pin, said standard having a second guide at right angles to the guide for the rack and in which the locking pin is mounted, and a foot depressible means for locking the pin in a depressed position, whereby it may be held in engagement with any one of the teeth of the rack.

4. In an automobile emergency brake lever lock, an emergency brake lever, a rack pivoted to one end thereof, a standard having a guide for the rack, a locking pin, said standard having a guide at right angles to the guide for the rack and in which the locking pin is mounted, a tumbler lock mounted for vertical movement on the upper end of the standard and being operatively connected to the locking pin, whereby when the tumbler lock is depressed, the pin is likewise moved, so that its lower end may engage any one of the teeth of said rack, thereby holding it in a locked position and the brake lever to a position to hold the brakes applied.

5. In an automobile emergency brake lever lock, an emergency brake lever, a rack pivoted to one end thereof, a standard having a guide for the rack, a locking pin, said standard having a guide at right angles to the guide for the rack and in which the locking pin is mounted, a tumbler lock mounted for vertical movement on the upper end of the standard and being operatively connected to the locking pin, whereby when the tumbler lock is depressed, the pin is likewise moved, so that its lower end may engage any one of the teeth of said rack, thereby holding it in a locked position and the brake lever to a position to hold the brakes applied, and means locking the tumbler lock in a depressed position.

6. In an automobile emergency brake lever lock, an emergency brake lever, a rack pivoted to one end thereof, a standard having a guide for the rack, a locking pin, said standard having a guide at right angles to the guide for the rack and in which the locking pin is mounted, a tumbler lock mounted for vertical movement on the upper end of the standard and being operatively connected to the locking pin, whereby when the tumbler lock is depressed, the pin is likewise moved, so that its lower end may engage any one of the teeth of said rack, thereby holding it in a locked position and the brake lever to a position to hold the brakes applied, and means locking the tumbler lock in a depressed position, and means for moving the tumbler lock upward when released.

In testimony whereof I hereunto affix my signature.

GODFREY BELL.